United States Patent [19]

Simonin

[11] Patent Number: 5,158,354

[45] Date of Patent: Oct. 27, 1992

[54] DEVICE FOR SCREWING AND UNSCREWING SCREWS, BOLTS AND NUTS

[75] Inventor: Jacques Simonin, Beure, France

[73] Assignee: Spiranyl S.a.r.l., Orchamps, France

[21] Appl. No.: 580,651

[22] Filed: Sep. 11, 1990

[30] Foreign Application Priority Data

Feb. 7, 1990 [IT] Italy .................................. 34813 90

[51] Int. Cl.⁵ ............................................. B25B 19/00
[52] U.S. Cl. ..................................... 362/119; 81/464; 173/164
[58] Field of Search .................. 362/119, 109, 253; 81/57.14, 464, 466; 173/12, 123, 128, 139, 163, 164

[56] References Cited

U.S. PATENT DOCUMENTS

| | | | |
|---|---|---|---|
| 2,525,588 | 10/1950 | Cameron et al. | 362/119 |
| 2,533,703 | 12/1950 | Wilhide et al. | 81/464 |
| 3,212,590 | 10/1965 | Hoza et al. | 81/464 |
| 3,951,217 | 4/1976 | Wallace et al. | 173/163 |
| 4,110,054 | 8/1978 | Moeller, Jr. | 403/373 |
| 4,316,512 | 2/1982 | Kibblewhite et al. | 173/12 |
| 4,324,158 | 4/1982 | Le Roy | 362/119 |
| 4,505,170 | 3/1985 | Van Laere | 81/464 |
| 4,727,780 | 3/1988 | Huang | 81/57.14 |
| 4,833,782 | 5/1989 | Smith | 362/119 |
| 4,991,472 | 2/1991 | Hollingsworth | 81/464 |

Primary Examiner—Richard R. Cole
Attorney, Agent, or Firm—Bucknam and Archer

[57] ABSTRACT

Device for screwing and unscrewing screws, bolts and nuts comprising an electric motor (2), a flywheel (14) fixed on an auxiliary shaft (5) connected to the output shaft of the electric motor by means of a pair of pinions (3, 4) made of elastic plastic material like polyurethane and a wrench (9) connectable to said flywheel by way of projecting teeth (15, 16) and moving axially in relation to said flywheel by way of an elastic member (11).

8 Claims, 1 Drawing Sheet

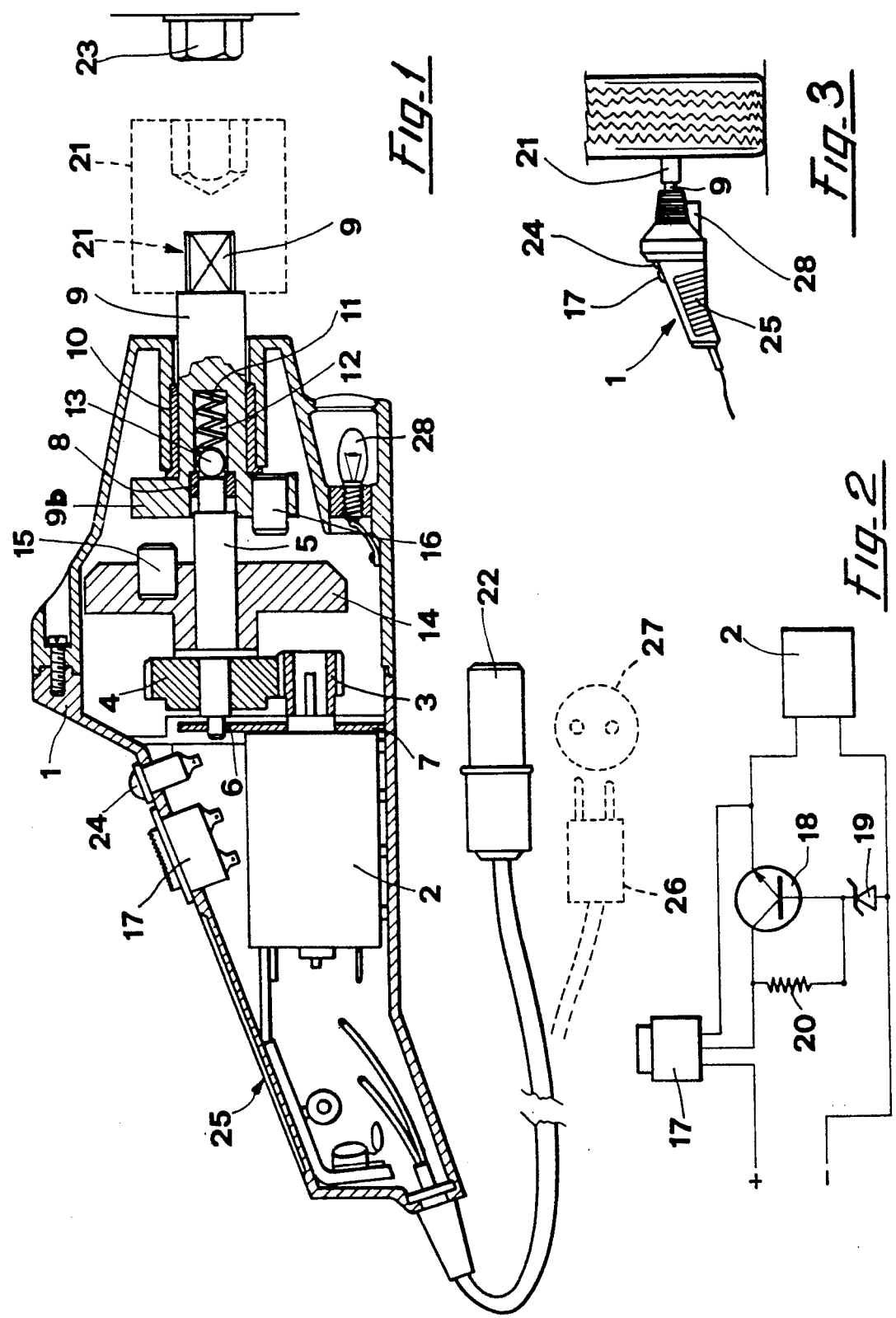

DEVICE FOR SCREWING AND UNSCREWING SCREWS, BOLTS AND NUTS

The present invention relates to a device for screwing and unscrewing screws, bolts, nuts and the like.

More specifically the present invention relates to a device for screwing and unscrewing screws, bolts and nuts of motor vehicle wheels.

It is known that unscrewing the bolts of motor vehicle wheels is very often difficult and sometimes impossible to perform manually due to the fact that they are usually tightened in automotive repair shops with pneumatic wrenches.

This difficulty of unscrewing is increased by the corrosive action of certain products such as for example antifreeze which when spread on streets and motorways affects the bevelled holes designed for centering said bolts.

Devices which facilitate unscrewing of nuts and bolts and are conveniently used for breaking loose wheel nuts are already known.

In particular a device is known which comprises an electric motor, powered by the motor vehicle battery and on the output shaft of which is arranged a flywheel connected to a wrench through connecting means and said wrench slides axially in relation to the flywheel under the effect of elastic means which provide engagement.

But said device is relatively complicated and costly.

The object of the present invention is to provide a screwing and unscrewing device for screws, nuts and/or bolts which would be simple and hence economical.

These and other objects which will appear in the description given below are achieved by a screwing and unscrewing device comprising an electric motor provided with an output shaft, a flywheel connected to and driven by said output shaft, and a wrench connectable to said flywheel and moving axially in relation thereto by elastic means, wherein, in accordance with the present invention, the flywheel is fixed on an auxiliary shaft connected to the output shaft of the motor through a pair of pinions made of elastic plastic material.

The pinions are pressure-assembled on an output shaft and an auxiliary shaft respectively.

The pinions can be made of any elastic plastic material such as polyurethane, polyethylene, nylon, PVC, ABS or AES resins etc. although the best results have been achieved using polyurethane pinions.

Under ordinary conditions the pinions provide rotation of the auxiliary shaft. When this shaft is engaged with the wrench the energy accumulated by the rotating flywheel at rated operating speed is discharged instantaneously on the wrench enabling it to break loose and unscrew the bolt or nut which at that moment is engaged by said wrench. At the instant the energy is discharged the auxiliary shaft is immobilized momentarily while the motor is not stopped thanks to the pinions which, being of elastic plastic material and pressure-assembled on their respective shafts, slide elastically thereon. This makes unnecessary any engagement and disengagement means.

In accordance with one embodiment of the device of the present invention connection between the flywheel and the wrench is achieved by a laterally projecting tooth fixed to the flywheel which makes contact with another tooth integral with the wrench during rotation of the flywheel when the wrench is moved axially toward said flywheel.

The invention may include an inverter and an electronic device designed to limit the supplied voltage. It is thus possible to rotate the wrench, even in the direction of tightening or screwing down, by exerting a tightening torque lower than that of opening or unscrewing. This further facilitates the subsequent operations of breaking loose or unscrewing the nuts, screws or bolts.

The device of the present invention may also include luminous means of control of the rated operating speed of the flywheel, front lighting means to facilitate fitting of the wrench on the heads of the screws, bolts or nuts, and electrical powering of the motor derived from the dashboard cigar lighter of the vehicle or the mains.

The construction or functional characteristics of the present device can be understood better from the detailed description given below and in which reference is made to the figures of the annexed drawing which illustrate a preferred embodiment given as a nonlimiting example of the present invention and wherein:

FIG. 1 shows a schematic view of a longitudinal cross section of the device of the present invention, FIG. 2 shows a schematic view of the electrical supply circuit of the motor, and FIG. 3 shows a perspective view of the device of FIG. 1 in operating position.

The device for screwing and unscrewing screws, nuts or bolts comprises an outer case (1) in which is fixed a direct current electric motor (2). On the output shaft of said motor is pressure-assembled a first pinion (3) which engages with a second pinion (4) pressure-assembled on an auxiliary shaft (5). The two pinions (3) and (4) are of elastic plastic material and preferably polyurethane. One of the ends of the shaft (5) is engaged in a seat (6) provided in a plate (7) fixed to the outer case (1) while its other end is engaged in a seat (8) provided at one end of a shaft (9) which constitutes the screwing and/or unscrewing element, i.e. the wrench.

Said shaft (9) is assembled in such a manner as to slide axially and rotate in a seat (10) made in the outer case (1) and projects therefrom outward. The free projecting end (9a) of said shaft (9) has a square cross section to permit engagement in the seats (21a) of the interchangeable ferrules (21) which engage the heads of the nuts or bolts (23). In the axial cavity (12) of the shaft (9) is positioned a spring (11) which holds a ball (13) pressed against the end of the shaft (5).

The inner end of said shaft (9) is provided with a flange (9b).

On the shaft (5) is permanently keyed a flywheel (14) having a laterally projecting tooth (15) which enters in contact and engages in a driving manner with another tooth (16) fixed on the side surface facing the flywheel of the flange (9b) of the shaft (9). Engagement of the two teeth takes place when the shaft (9) engages its end (9a) with a screw, bolt or nut and is made to slide axially, thrusting the device toward the nut (23) and compressing the spring (11).

The teeth (15) and (16) can consist of two ordinary cylindrical pins or, to ensure better gripping or engagement, one of them can be given two opposing longitudinal grooves or notches in which is inserted part of the other tooth at the time of mutual engagement, depending on the direction of rotation, screwing or unscrewing.

The motor (2) can be connected through an invertor switch (17) directly to a cigar lighter or an outlet (22)

which can be inserted in the female part of a cigar lighter fixed to the dashboard of a vehicle. Alternatively the motor (2) can be connected to a mains power outlet (27) through an appropriate transformer.

With the invertor (17) in one position the electrical connection is direct. In the other position the connection is provided by a transistor (18) whose base is connected to the negative pole of a Zener diode (19) having a damping voltage of 16 V. A resistance (20) is placed between the Zener diode and the positive pole of the power source.

To break loose and unscrew a bolt (23) of a wheel the user starts the motor (2), inserting for example the cigar lighter plug (22) in the female outlet of the vehicle dashboard or the plug (26) of the transformer in the mains outlet (27) and placing the invertor (17) in the direct supply position of the motor (22), normally 12 V.

The appropriate ferrule (21) with the corresponding seat (21a) engaged with the square end (9a) of the shaft (9) is fitted on the head of the screw, nut or bolt (23).

Under these conditions it is essential to wait for the flywheel (14), driven by the motor (2), to reach its rated operating speed. This is indicated by a LED (24) which lights up when said speed is reached.

The device is gripped like a pistol in the rear part (25) and thrust toward the wheel. The tooth (15) of the rotating flywheel draws near the shaft (9) and enters in contact with the tooth (16) with a violent impact. In the impact of the teeth the energy stored in the flywheel (14) at rated RPM is discharged instantaneously on the shaft (9) and transmitted to the square end (9a) and then to the bolt (23) which breaks loose and is unscrewed. At the instant of impact between the teeth (15) and (16) the shaft (15) is momentarily immobilized while the pressure-assembled pinion (4) slides thereon.

The pressure-assembled pinion (3) behaves similarly on the output shaft of the motor (2). Thanks to the elasticity of the plastic material of the pinions (3) and (4) and their pressure coupling on their respective shafts the impact and momentary stopping produced by the impact of the teeth (15) and (16) is not transmitted to the motor (2), which continues to rotate.

To tighten a bolt the user proceeds in the same manner but with the invertor (17) placed in the position of supply of the motor (2) through the transistor (18) controlled by the diode (19). The motor (2) being supplied at reduced voltage rotates at lower speed. The tightening torque exerted on the bolt (23) is thus less than that exerted during breaking loose.

The device is preferably equipped with a service lamp (28) in the lower part which, during operation, illuminates the space in front to facilitate fitting of the ferrules keyed on the square end (9a) of the shaft (9) on the heads of the nuts, bolts or screws (23).

Lighting of the service lamp (28) and the device which leads to lighting of the LED (24) when the flywheel (14) reaches its rated operating speed are preferably performed automatically and simultaneously with the starting of the motor (2).

Although the invention has been described for a specific embodiment it is evident that many alternatives and variations will be apparent to those skilled in the art in the light of the foregoing description. Accordingly the invention is intended to embrace all the alternatives and variations that fall within the spirit and scope of the appended claims.

I claim:

1. Device for screwing and unscrewing screws, bolts and nuts comprising a case (1) an electric motor (2) provided with an output shaft and inserted in said case (1), a first pinion (3) pressure assembled on said output shaft, an auxiliary shaft (5) having a first end and a second end, said auxiliary shaft being mounted at said first end on said case (1), a wrench (9) forming a seat (8) wherein said second end of said auxiliary shaft is engaged, a second pinion (4) pressure assembled on said auxiliary shaft (5), said first pinion engaging said second pinion, said first and second pinion being made of plastic elastic material, a flywheel (14) connected to said auxiliary shaft and driven thereby, said wrench (9) being connectable to said flywheel (14) and moving axially in relation thereto by means of elastic means (11).

2. The device according to claim 1 wherein said pinions (3, 4) are made of polyurethane.

3. The device according to claim 1 wherein said flywheel (14) is provided with a projecting driving tooth (15) and said wrench (9) is provided with a projecting tooth (16), said teeth (15, 16) engaging each other during rotation of said flywheel and when the wrench (9) is moved axially toward said flywheel.

4. The device according to claim 3 wherein said wrench (9) has an inner end and an outer end and is provided at said inner end with a flange (9b) said projecting tooth (16) being fixed on said flange.

5. The device according to claim 1 wherein said case (2) has a plate (7) fixed thereon, said plate has a seat (6) and said auxiliary shaft (5) is mounted on said case (2) by engaging in said seat (6).

6. The device according to claim 1 which comprises an invertor switch (17) and an electronic device (18, 19) adapted to power said motor (2) with a direct or limited voltage.

7. The device according to claim 6 which is provided with a LED (24) which lights up when said flywheel (14) reaches rated operating speed.

8. The device according to claim 1 which has a front space and a rear space and which is provided with service lamp (28) in a lower position thereof, said service lamp having a beam directed toward said front space.

* * * * *